United States Patent [19]

Takahashi

[11] Patent Number: 5,107,725

[45] Date of Patent: Apr. 28, 1992

[54] HYDRAULIC PRESSURE CONTROL APPARATUS FOR AUTOMATIC TRANSMISSION

[75] Inventor: Shigeo Takahashi, Aichi, Japan

[73] Assignee: Aisin Seiki Kabushiki Kaisha, Kariya, Japan

[21] Appl. No.: 510,795

[22] Filed: Mar. 30, 1990

[30] Foreign Application Priority Data

Mar. 30, 1989 [JP] Japan .................................. 1-80559
Nov. 29, 1989 [JP] Japan .................................. 1-307614

[51] Int. Cl.$^5$ .................................................. B60K 41/06
[52] U.S. Cl. .................................................. 74/867
[58] Field of Search .................. 74/867; 192/1.36, 1.4, 192/1.41, 1.42, 4 A

[56] References Cited

U.S. PATENT DOCUMENTS

| | | | |
|---|---|---|---|
| 4,462,277 | 7/1984 | Miki et al. | 74/867 |
| 4,476,746 | 10/1984 | Miki et al. | 74/867 |
| 4,753,134 | 6/1988 | Hayasaki | 74/867 |

FOREIGN PATENT DOCUMENTS 62-61843 3/1987 Japan .
63-291751 11/1988 Japan .
64-87951 4/1989 Japan .
64-87952 4/1989 Japan .
64-87953 4/1989 Japan .
64-87963 4/1989 Japan .

*Primary Examiner*—Richard Lorence
*Assistant Examiner*—Ryan W. Massey
*Attorney, Agent, or Firm*—Burns, Doane, Swecker & Mathis

[57] ABSTRACT

In a hydraulic pressure control apparatus for an automatic transmission, a retarding control apparatus has a first retarding signal output for processing the engine output decreasing rate and outputting a corresponding retarding signal, the absorbed power of the engine upon retarder operation is sensed, and the pressure oil is regulated to a predetermined pressure wherein the predetermined pressure is modulated responsive to the absorbed power of the engine. A second retarding signal outputting outputs a retarding signal corresponding to braking operation and a switch changes over the connection to the retarder, upon detecting a braking operation, from the first retarding signal to the second retarding signal and vice versa. The shifting shock during operation of retarder is eliminated even under elevated hydraulic pressure during the retarder operation.

8 Claims, 12 Drawing Sheets

PRIOR ART

HYDRAULIC PRESSURE CONTROL APPARATUS FOR AUTOMATIC TRANSMISSION

FIELD OF THE INVENTION

This invention relates to a hydraulic pressure control apparatus for an automatic transmission and, more particularly, to an hydraulic pressure control apparatus for an automatic transmission which is used in conjunction with an exhaust brake or generally a retarder.

BACKGROUND OF THE INVENTION

When the pressure characteristics of the line pressure of a hydraulic pressure control apparatus are set in agreement with the driving state of an ordinary engine, pressure setting becomes too low for the reverse torque of the engine on operation of an exhaust brake, so that problems are raised in connection with durability characteristics of the friction engaging elements. In order to cope with such problems, a technique of elevating the line pressure to a predetermined pressure as a function of the exhaust braking signal has been proposed in the JP Patent KOKAI Publication No. 62-061843 (1987).

DISCUSSION OF THE PRIOR ART

With this prior-art technique, the braking torque of the exhaust brake, that is, the reverse engine torque, with the throttle opening equal to zero, differs with the prevailing vehicle speed at this instance, so that the reverse torque becomes the higher for higher vehicle speeds. As a result, the torque acting on the friction engaging elements is changed, so that, when the speed is changed during application of the exhaust braking, the transmission shifting shock is disadvantageously increased.

SUMMARY OF THE DISCLOSURE

First Aspect

It is therefore an object of the present invention to eliminate the above inconveniences and to provide a hydraulic pressure control apparatus for an automatic transmission provided with an exhaust brake, wherein transmission shifting shock is not produced on changing the vehicle speed during application of the exhaust braking.

For accomplishing the above object, there is provided, in accordance with a first aspect of the present invention, a hydraulic pressure control apparatus for an automatic transmission for a vehicle comprising:

absorbed power sensing means for sensing an absorbed power of an engine, signal generating means for outputting a signal responsive to an engine output, oil pressure generating means for generating an oil pressure, pressure regulating means for regulating the pressure oil from said oil pressure generating means to a predetermined pressure, and pressure modulating means provided to said pressure regulating means for modulating said predetermined pressure by receiving output signals from said power sensing means and said signal generating means.

Thus there is provided a hydraulic pressure control apparatus for an automatic transmission of a vehicle, according to which the line pressure of the automatic transmission of the vehicle is properly set to enable the friction engaging elements to be coupled with a proper engaging power at both times upon operation and non-operation of the exhaust brake.

By detecting the absorbed power by the engine, that is the exhaust brake, the line pressure necessary to produce an optimum engaging power for the friction engaging element may be adjusted properly as a function of the absorbed power.

In this manner, the transmission shift shock produced during speed changing can be reduced, whereas the load of the automatic transmission system on the friction engaging means can be reduced by virtue of pressure to an optimum engaging oil pressure, so that durability of the transmission may also be improved.

Detailed Discussion of the Prior Art

In a hydraulic pressure control apparatus for an automatic transmission in general, attempt has been made that the line pressure for engaging the friction engaging elements is regulated responsive to engine torque demand signals, such as throttle opening signal, to reduce the transmission shifting shock or power losses at the oil pump. However, with a large sized vehicle provided with a retarder, special consideration must be made at the time of regulation of the line pressure during the retarder operation.

For example, with a hydraulic pressure control apparatus for an automatic transmission which is employed in combination with a exhaust braking system frequently adopted as a retarder, if the pressure characteristics of the line pressure are set so as to be matched with the engine state during the time the retarder is out of operation, the engine torque demand signal becomes the least when the retarder comes into operation, with the line pressure being lowered, so that the line pressure setting becomes too low for the engine reverse torque caused by the retarder operation, thus causing the shortage of the engaging oil pressure of the friction engaging elements and prolonging their slide contact time to lower the durability of the friction engaging elements. On the other hand, if the line pressure is set so as to be matched with the engine driving state during the time the retarder is in operation, the line pressure during the time the retarder is out of operation becomes too high, thus increasing power loss at an oil pump and transmission shifting shock caused by sudden engagement of the engaging element.

A line a in FIG. 12 is an oil pressure characteristic diagram showing the relation between the throttle opening $\theta$ and the line pressure $P_L$ of a conventional hydraulic pressure control apparatus for an automatic transmission which is employed in combination with such retarder, and FIG. 13 is an oil pressure characteristic diagram showing the relation between the vehicle speed V and the line pressure $P_L$ in the same control apparatus. It may be seen from these figures that, when the line pressure characteristics are set so as to be matched with the usual engine driving state, the line pressure setting becomes too low for the reverse torque of the engine when the retarder comes into operation to lower the durability of the friction engaging elements.

For overcoming this inconvenience, there has been proposed in the JP Patent KOKAI Publication No. 62-61843 (1987) an oil pressure control apparatus in which the line pressure is raised to a predetermined value as a function of the exhaust brake or, generally, retarder.

The oil pressure control apparatus of this KOKAI publication is adapted for detecting the actuation of an engine exhaust brake, not shown, for controlling the pressure of the supply pressure oil to a friction engaging element 1 based on the detection signal, as shown in FIG. 11. In this figure, the numeral 2 denotes an oil pump, the numeral 3 a primary regulating valve, the numeral 4 a secondary regulating valve, the numeral 5 a throttle valve, the numeral 6 a manual valve, the numeral 7 a 1-2 shift valve, the numeral 8 a governor valve, the numeral 9 a solenoid valve and the numeral 10 an operation detection switch for detecting the operation of the exhaust brake.

With the above hydraulic pressure control apparatus, when the exhaust brake is actuated, switch 10 is turned on to cause the solenoid valve 9 to open a drain oil path so that the oil pressure prevailing in the throttle pressure oil paths L1, L2 is drained and hence the throttle oil pressure applied to the active surfaces of lands 5A, 5B of throttle valve 5 is relieved. Since the throttle valve 5 is so designed that the spool 5C is raised to a higher position for the larger throttle opening by a throttle cam, not shown, such that, when the engine exhaust brake is applied. The throttle pressure $P_{TH}$ is raised to the extent that the oil pressure in the oil paths L1, L2 is drained.

The line pressure is regulated at the primary regulating valve 3 to a higher value to the extent that the throttle pressure $P_{TH}$ becomes higher by the coming into operation of the exhaust brake than during the time the exhaust brake is out of operation, so that the oil pressure acting on the friction engaging element 1 is correspondingly increased. The state in which the line pressure is set to a higher valve is shown in FIG. 13 in which the relation between the vehicle speed and the line pressure is shown with the throttle opening as the parameter, as described hereinabove.

If the oil pressure acting on the friction engaging elements is raised in this manner, engagement may be terminated in a correspondingly shorter time and the slide contact time during which the friction engaging elements are slid relative to each other may be shortened to correspondingly improve the durability of the elements.

Problems in the Art

Second Aspect

With the conventional hydraulic pressure control apparatus for the automatic transmission system, the oil pressure characteristics curve a shown in FIG. 12 is changed to the characeristic curve b or c during the retarder operation to raise the line pressure to improve the durability of the friction engaging elements. However, the braking torque of the exhaust brake (absorbed torque of the engine) with the throttle opening set to zero, that is, when the acceleration pedal is released, is changed as a function of the prevailing vehicle speed, so that the torque acting on the friction engaging element is changed with the occasional vehicle speed and, consequently, a larger transmission shift shock is produced when the speed is changed during the operation of the exhaust brake.

SUMMARY OF THE DISCLOSURE

As stated before, it is an object of the present invention to provide a hydraulic pressure control apparatus for an automatic transmission which is free from the above drawbacks of the prior art apparatus.

In a second aspect of the present invention, it is an object of the present invention to provide a hydraulic pressure control apparatus for an automatic transmission in which, even when the speed changing operation is performed in the course of the retarder operation, the line pressure of the automatic transmission may be controlled so as not to produce transmission shift shock.

In the second aspect, the present invention provides a hydraulic pressure control apparatus for an automatic transmission comprising:

engine output sensing means, a retarding control apparatus having a first retarding signal output means for processing the engine output decreasing rate on the basis of a detection signal from said engine output sensing means and outputting a retarding signal corresponding to the engine output decreasing rate, absorbed power sensing means for sensing absorbed power of an engine caused by the operation of a retarder provided on a driving system of a vehicle, pressure regulating means for regulating the pressure oil from oil pressure generating means to a predetermined pressure and outputting the pressure oil thus regulated in pressure, and pressure modulating means responsive to an output signal from said absorbed power sensing means, for modulating said predetermined pressure to a predetermined value.

In the above hydraulic pressure control apparatus, the retarding control apparatus further includes a first retarding control assembly (1), or further a second retarding control assembly (2) as follows:

Namely the first retarding control assembly (1) includes first retarding signal outputting means which includes retarding signal outputting processing units having different output characteristics, and first selecting means for selecting said retarding signal outputting processing units in accordance with engine output on the basis of a detection signal from sensing signals from engine output sensing means.

The second retarding control assembly (2) includes brake operation sensing means, second retarding signal outputting means for outputting a retarding signal corresponding to braking on the basis of a detection signal from said brake operation switching means, and second selecting means (switching means) for changing over the connection to said retarder, upon detecting a braking operation by said brake operation sensing means, from said first retarding signal outputting means to said second retarding signal outputting means, or vice versa. The above described hydraulic pressure control apparatus for an automatic transmission according to the second aspect of the present invention operates in the following manner. In the retarding control apparatus, the first retarding signal outputting means output a retarding signal to the retarder on the basis of an engine output detection signal, such as a throttle opening detection signal, from engine output detection means, such as throttle opening detection means, for applying a corresponding braking power to the engine output.

Meanwhile, when the retarding control apparatus includes a plurality of retarding signal outputting processing units and switching means therefor (the first switching means), retarding control of the engine output can be performed in a more appropriate manner. Also, in the case where the retarding control apparatus includes brake operation detection means, the retarding signal from the first retarding signal outputting means is interrupted by the detection signal from the detection means, such as a braking pressure, while the retarding signal is outputted to the retarder by the second retarding signal outputting means to effect proper retarding control in accordance with the brake operating state.

When the retarder is operated by the retarding control apparatus, the absorbed torque of the engine, such as the engine exhaust pipe pressure, detected by absorbed power detection means, is inputted to pressure regulation control means (e.g., an actuator), which pressure regulation control means controls the operation of oil pressure regulation means, that is the primary regulating valve or throttle valve, as a function of the absorbed power, to regulate the oil pressure from oil pressure generating means, such as pump, to a predetermined pressure to output the thus regulated oil pressure. The output from the pressure regulating means is supplied to the oil pressure control circuit as the line pressure and/or an engaging oil pressure for the friction engaging elements, so that the engaging oil pressure corresponding to the absorbed power of the engine is supplied to the friction engaging elements constituting the transmission system during the retarder operation. Thus there is produced no transmission shifting shock even when the speed change operation is performed during the retarder operation.

Third Aspect

Further, according to a third aspect of the present invention, there is provided a retarding control apparatus for automotive vehicle comprising:
engine output sensing means, and
a first retarding signal output means for processing the engine output decreasing rate on the basis of a detection signal of said engine output sensing means, and outputting a retarding signal corresponding to the engine output decreasing rate. According to this aspect, the retarder can be controlled in accordance with the driver's intent and the running state of the vehicle without recourse to troublesome manual switching operation.

The novel points thought to be characteristics of the present invention are shown in the appended claims. However, the invention per se and the other objects as well as advantages of the present invention will be more readily understood from reading the following detailed description of the present invention in conjunction with the appended drawings.

DETAILED DESCRIPTION OF THE PREFERRED EMBODIMENTS

Figure 1:
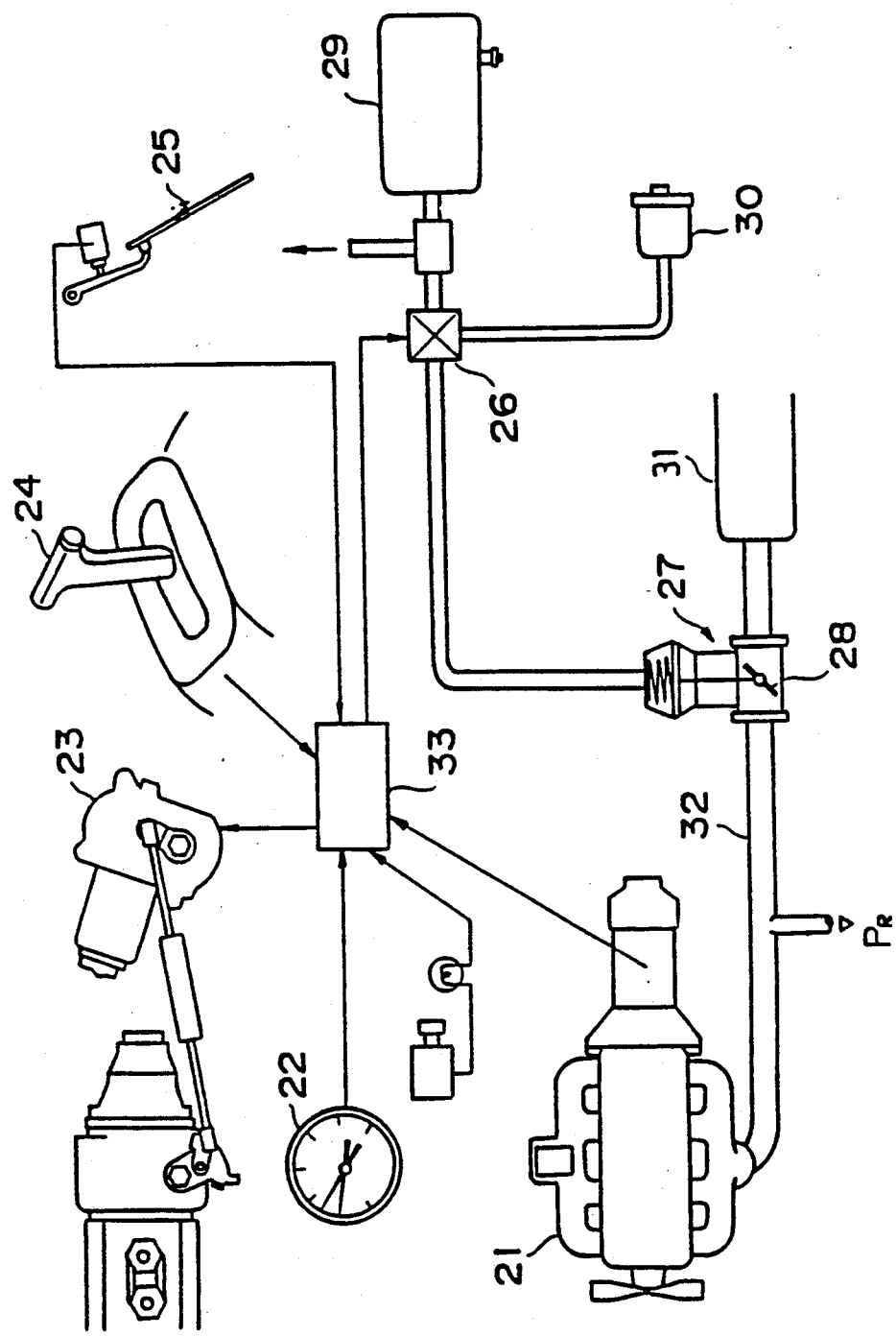
FIG. 1 shows a control system showing an engine exhaust brake control system according to an embodiment of the present invention.

By referring to the drawings, a hydraulic pressure control apparatus according to a preferred embodiment of the present invention in which an exhaust braking system is employed as a retarder will be explained in detail.

FIG. 1 shows an engine exhaust braking system to which the present invention Pertains. In this figure, the numeral 21 denotes an engine, the numeral 22 a speedometer, the numeral 23 a fuel injection device, the numeral 24 a shift lever, the numeral 25 a throttle pedal (accelerator pedal), the numeral 26 an exhaust brake solenoid, the numeral 27 a exhaust brake valve, the numeral 29 a vacuum tank, the numeral 30 an air cleaner and the numeral 31 an exhaust muffler. The exhaust brake 27 is provided halfway in a exhaust pipe 32 interconnecting an exhaust muffler 31 and the engine 21. The operating state of the various devices or units are converted into electrical signals so as to be inputted to a control unit 33 including CPU.

The control operation of the control unit 33 is such that, with the shift lever 24 in the forward stage, with the operating angle of throttle pedal and hence with the throttle opening degree equal to zero and with the vehicle speed not less than 15 km/h, the exhaust brake 27 is operated and the fuel supply is cut at the fuel injection device 23. In this case, the exhaust brake valve 28 adapted to throttle the exhaust gas is turned on and off in a controlled manner. This exhaust brake valve may also be designed as a control valve with an adjustable opening. The pressure $P_R$ within the exhaust pipe 32 is changed as shown by curves A and B in FIG. 2 during the operation of the exhaust brake 27, while being changed as shown by a curve C in FIG. 2 during the non-operation of the exhaust brake 27.

Figure 2:
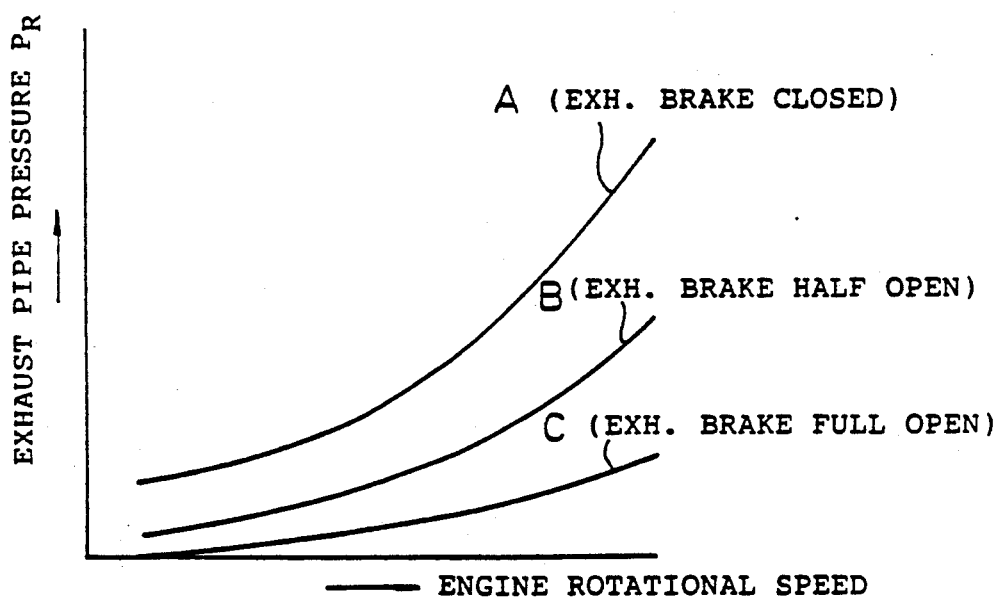
FIG. 2 shows pressure characteristics curves for illustrating the relation between the rotational speed of the engine and the pressure in the exhaust pipe in the exhaust brake control system shown in FIG. 1.
Figure 3:
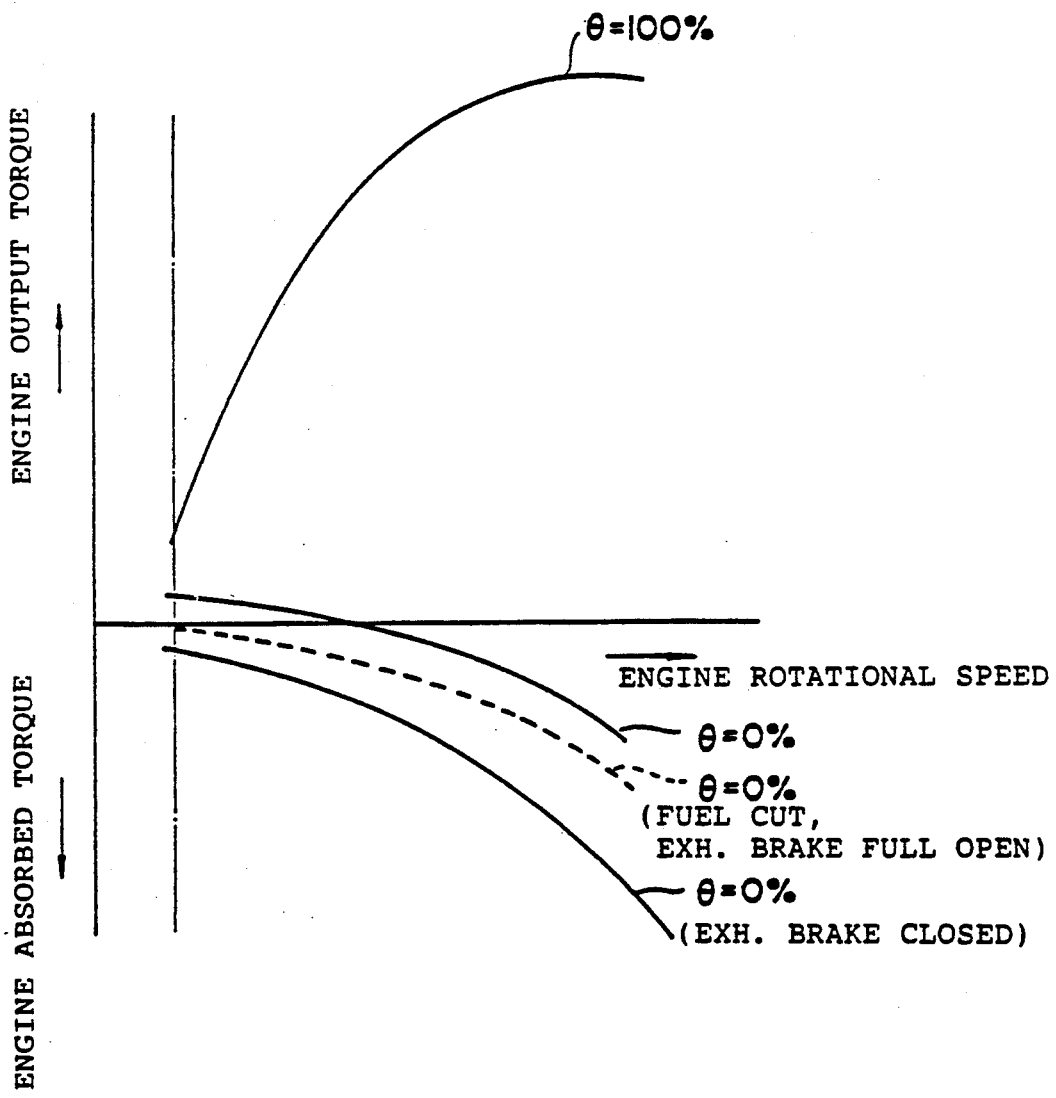
FIG. 3 shows characteristics curves for illustrating the relation between the engine rotational speed and the absorbed power of the engine in a vehicle fitted with an exhaust brake valve in general.

FIG. 3 shows torque characteristics curves showing the relation between the operation of the exhaust brake valve 28 and the power absorbed by the engine 21. It will be seen upon comparison that the power characteristics curves of FIG. 3 are substantially in agreement with the characteristics curves of FIG. 2 showing the characteristics of the exhaust pipe pressure and the operation of the exhaust brake valve 28, such that the braking operation may be adjusted by suitably adjusting the opening degree of the exhaust brake valve 28.

Figure 4:
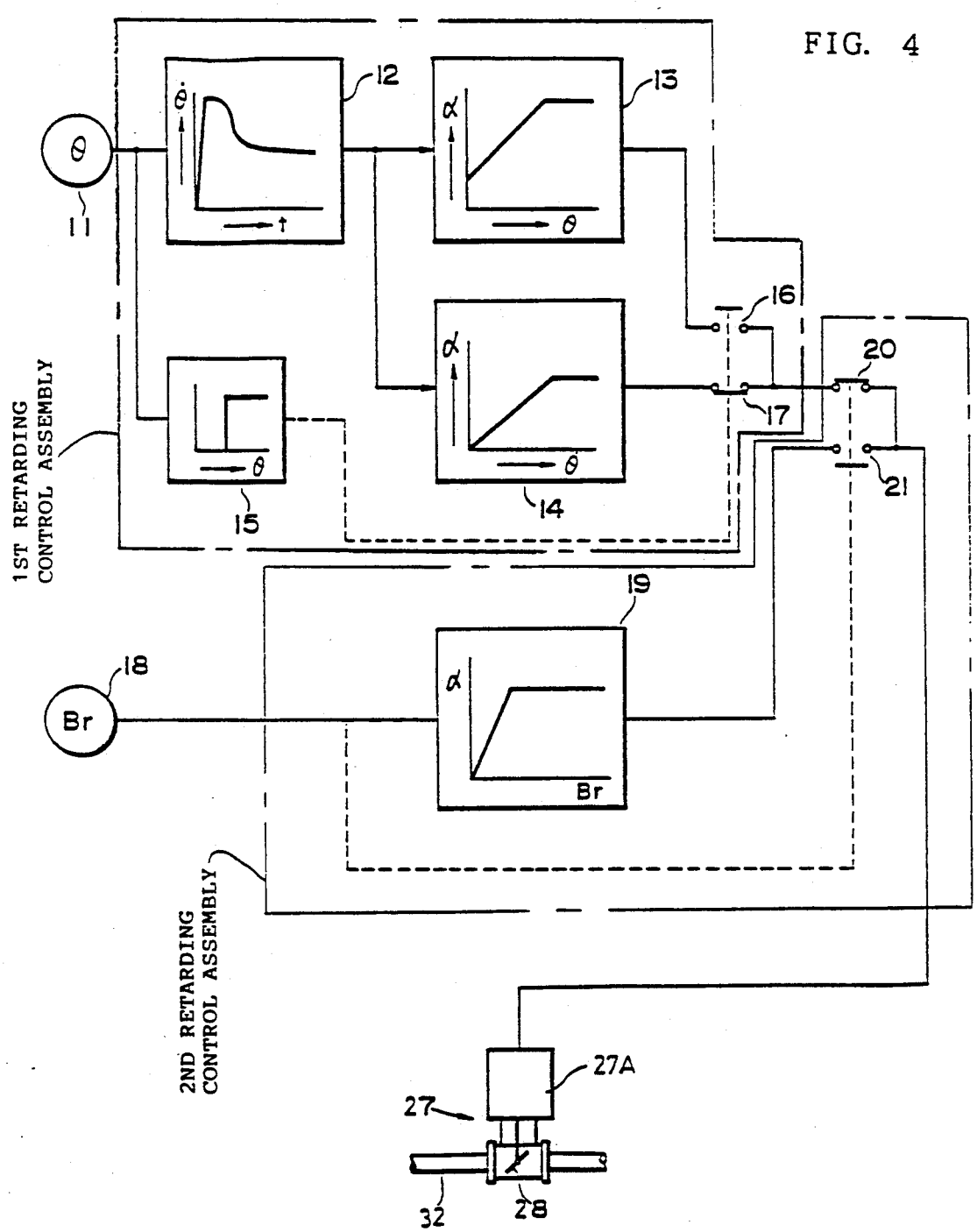
FIG. 4 is a control block diagram showing an embodiment of a retarding control apparatus of a hydraulic pressure control apparatus according to an embodiment of the present invention.

FIG. 4 shows a circuit for controlling the opening degree of the exhaust brake valve 28 (see FIG. 1) as a function of the opening degree $\theta$ of the throttle pedal 25 and its restoration speed r for the case where the exhaust brake 27 of the engine is designed as a control valve with an adjustable opening.

Referring to FIG. 4, a throttle opening signal $\theta$ from a throttle opening sensor 11 is discriminated by a throttle pedal speed processing unit 12 and the restration speed signal $r = -d\theta/dt$ or the throttle pedal speed of a throttle pedal 5 is outputted to first and second exhaust brake valve control processing units 13 and 14 which are processing units for outputting retarding signals. These exhaust brake valve control processing units 13, 14 output an opening command signal $\alpha$ to the exhaust brake valve 28 corresponding to the restoration speed signal r from the unit 12 (further originating from the throttle pedal 25) which is represented by a peak value $r_P$ for each pedal restoration operation. The opening signal $\alpha$ is controlled for fully opening the exhaust braking valve at $\alpha = 0$, and closing the valve with increase in the opening command signal $\alpha$.

The exhaust brake valve control processing units 13 and 14 have different conversion ratios (none precisely, characteristic curves) for the opening command signal $\alpha$ with respect to the restoration speed signal r (e.g., peak value, $r_P$) such that the exhaust brake valve is urged to be closed in a greater rate or degree for the processing unit 13 than the unit 14.

On the other hand, the throttle opening signal $\theta$ is inputted to a comparator 15 and, when the opening (and hence the throttle opening signal $\theta$) exceeds a predetermined value, a signal is outputted to turn on a switch 16 while turning off a switch 17. With the throttle opening $\theta$ less than a predetermined valve, switch 16 is turned off, while switch 1 is turned on. Meanwhile, for controlling the exhaust brake valve, a value of the throttle opening $\theta$ at an instance just before restoration of the throttle pedal is adopted. FIG. 4 shows the state just before restoration of the throttle pedal in which the throttle opening $\theta$ is less than the predetermined value and hence the states of the switches 16, 17 are not yet changed over. In this state, subject to the condition that the switch 20 as later described is turned on, a signal from the second exhaust brake valve control processing unit 14 is input to an actuator 27A adapted for opening and closing the exhaust brake valve 28. This actuator 27A controls the exhaust brake valve 28 to a predetermined opening.

When the throttle opening $\theta$ becomes higher than a predetermined value, switches 16, 17 are moved down in FIG. 4 so that the switch 16 is turned on while the switch 17 is turned off so that the exhaust brake valve 8 is actuated by a signal form the first exhaust brake valve control processing unit 13. Referring further to FIG. 4, a signal from a braking pressure sensor 18 is inputted to a third exhaust brake valve control processing unit 19 where the signal is converted into the output opening command signal $\alpha$ of the exhaust brake valve 28 corresponding to the braking pressure. The states of the switches 20, 21 are reversed by the turning on and off, that is the pressure or the absence, of the signal from the brake pressure sensor 18.

On depression of a vehicle brake pedal, that is a foot brake, the switch 20 is turned off, while the switch 21 is turned on, so that the opening command signal $\alpha$ from the first exhaust brake valve control processing unit 13 or the second exhaust brake valve control processing unit 14 is interruputed and, in this state, the opening command signal $\alpha$ from the third exhaust brake valve control processing unit 19 is inputted to control the opening degree of the exhaust brake valve 28.

Figure 5:
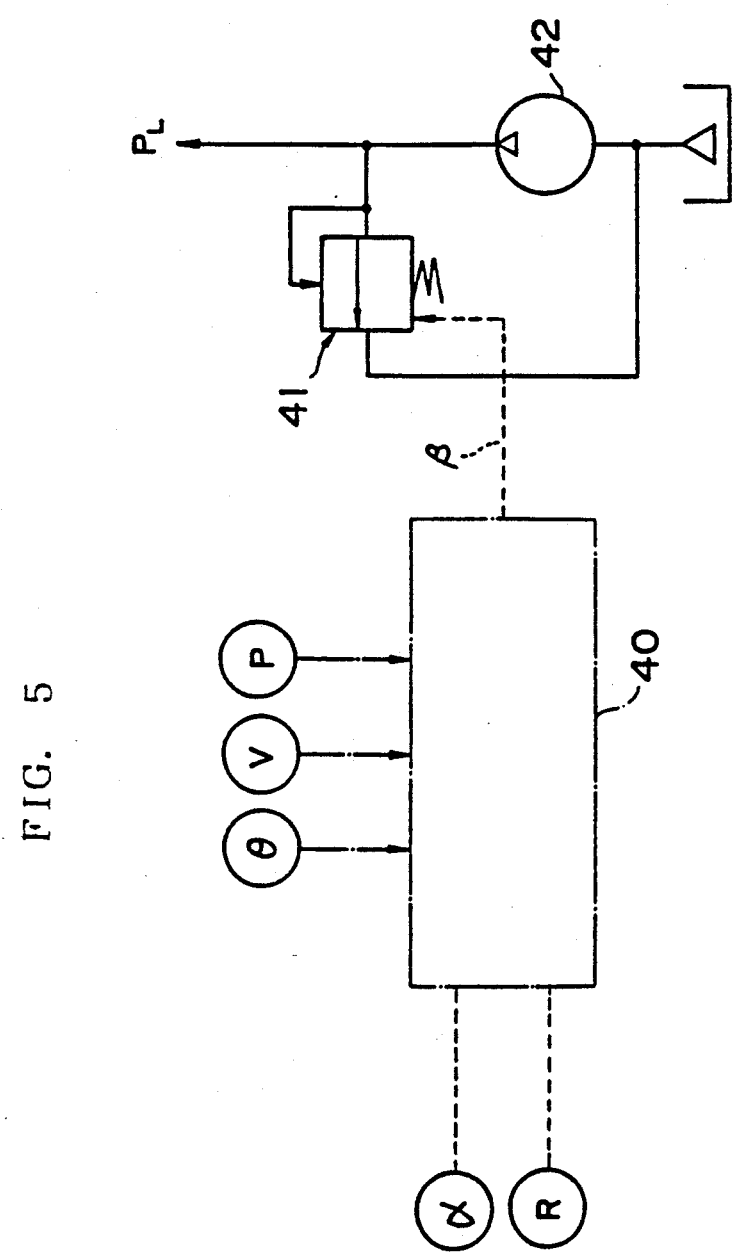
FIG. 5 is a diagrammatic view showing an embodiment of a hydraulic pressure control apparatus of the present invention.

FIG. 5 is a block diagram showing an example of a hydraulic pressure control apparatus for an automatic transmission having the above mentioned retarding control apparatus according to the present invention. The throttle opening signal $\theta$, vehicle speed signal V and the shift position signal P of the transmission are inputted to a control circuit 40. Based on these signals, the control circuit 40 outputs an operating signal $\beta$ to a primary regulating valve 41 functioning as pressure regulating means. The valve 41 is responsive to the actuating signal $\beta$ from the control circuit 40 to regulate the hydraulic pressure output from an oil pump 42 functioning as hydraulic pressure generating means to supply the regulated hydraulic pressure to friction engaging elements of the automatic transmission, not shown, as a line pressure $P_L$. This line pressure $P_L$ has the above mentioned characteristics as shown in FIGS. 2 and 3.

To the control circuit 40 are also inputted the opening command signal $\alpha$ for the exhaust brake from the retarding control apparatus shown in FIG. 4 and the engine absorbed torque signal R sensed by a torque sensor. The control circuit 40 outputs an operating signal pressure $\beta$ corresponding to the absorbed torque signal R to the primary regulating valve 41, which signal $\beta$ functions to operate the valve 41 to regulate the line pressure $P_L$ so as to corresponds to the absorbed torque R. Thus the line pressure $P_L$ is changed with characteristics (FIG. 2) with which the exhaust pipe pressure is changed in accordance with the engine rotational speed and the opening degree of the exhaust brake valve.

Figure 13:
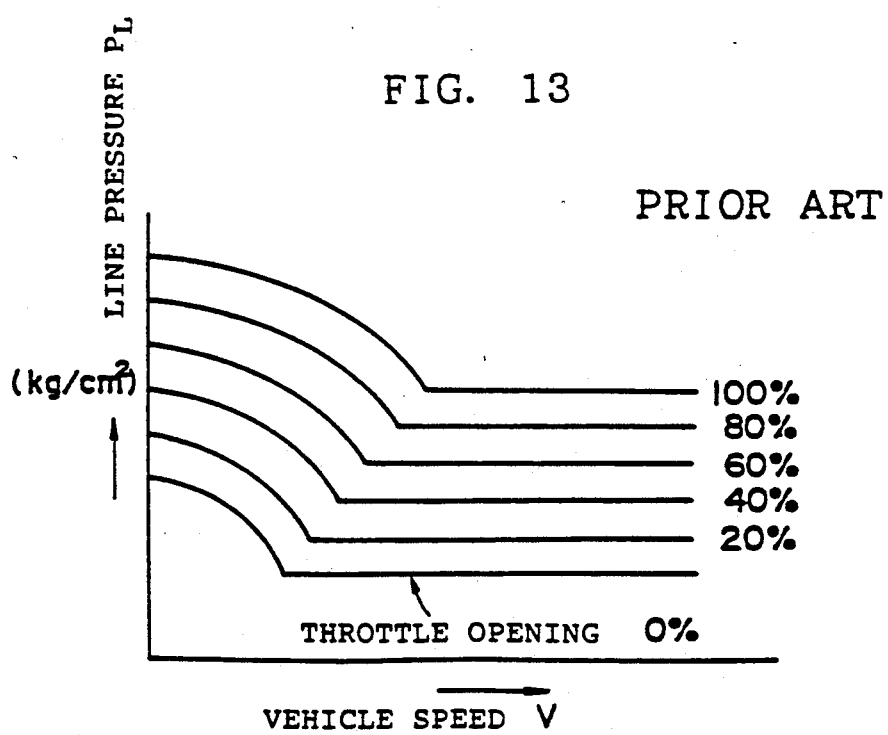
FIG. 13 is a diagram showing the relation between the vehicle speed and the hydraulic line pressure in the conventional hydraulic pressure control apparatus of FIG. 12.

To a conventional hydraulic pressure control circuit, a primary regulating valve is provided with an actuator adapted for directly pressing a plunger provided in the primary regulating valve. To the actuator are inputted the pressure $P_R$ in the exhaust pipe shown in FIG. 1 and an operating signal for a changeover switch (switching means) for the exhaust brake 27 shown in FIG. 5. Whe the exhaust brake is actuated, the oil pressure $P_L$ corresponding to the vehicle speed V shown in FIG. 13 is produced and supplied to various elements, since the signal pressure R ($P_R$) is supplied to the actuator.

Figure 6:
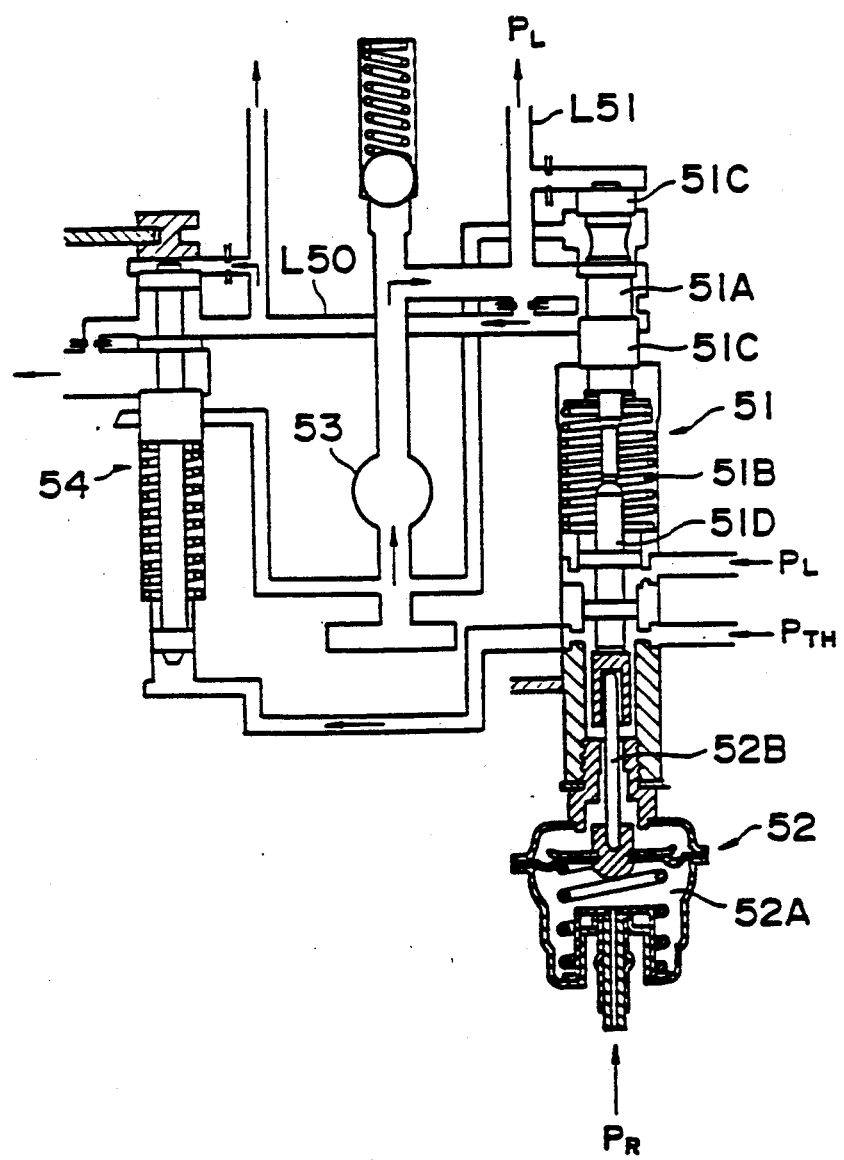
FIG. 6 is a hydraulic circuit diagram for a hydraulic pressure control apparatus according to an embodiment of the present invention.

FIG. 6 shows an embodiment of a hydraulic pressure control apparatus for directly controlling the operation of the primary regulating valve by the absorbed power signal R for regulating the line pressure $P_L$ during the operation of the exhaust brake. The primary regulating valve 51 is fitted with an actuator 52 which is responsive to the input absorbed power signal $P_R$ as the signal R (the pressure in the exhaust pipe 32 in FIG. 32) to thrust a plunger 51A of the primary regulating valve 51 to regulate the line pressure $P_L$. With the primary regulating valve 51, the oil pressure generated by an oil pump 53 is applied to the upper end of a land 51C which is thrust upwards by a spring 51B to act downwardly thereon. When the force of spring 51B is overcome by this oil pressure, the plunger 51A is moved downwards. This causes the oil path towards a secondary regulating valve 54 so far closed by the land 51C to be opend to lower the oil pressure acting on land 51C to shift the plunger 51 again upwards to throttle the oil path L50 to the secondary regulating valve 54. By repetition of the above described operations, the line pressure $P_L$ is maintained at a constant value by the primary regulating valve. To the primary regulating valve 51 are inputted a throttle pressure $P_{TH}$ and a line pressure $P_L$ for the manual shift position in the 2, L and R ranges and act upwardly on the plunger 51D. In this manner, the line pressure $P_L$ output from the oil path is regulated as a function of the throttle pressure $P_{TH}$ and the line pressure $P_L$ for the 2, L and R ranges. Thus the line pressure $P_L$ is regulated during the high load condition to a higher value to procure the engaging pressure of the friction engaging elements, such as the clutch or brake, while the line pressure $P_L$ is regulated during the low load condition to a lower value to improve the efficiency.

When the exhaust brake 27 is actuated by the retarding control apparatus shown in FIG. 4, the pressure within a chamber 52A of the actuator 52 is raised by the increase in the operation signal pressure input to the actuator 52 to urge a rod 52B upwards in FIG. 4. This rod 52 in turn operates to urge the plunger 51A by means of the plunger 51D to slide the plunger 51A upwards in FIG. 4. This causes the land 51C to throttle the oil path L50 to the secondary regulating valve 54 to raise the line pressure $P_L$ outputted from oil path L51.

In this manner, the actuator 52 controls the operation of the primary regulating valve 51 on the basis of the operation signal pressure $P_R$ corresponding to the absorbed power signal R (equivalent to $\beta$ in FIG. 5), so that the line pressure $P_L$ is increased in proportion to an increase in the absorbed torque R (pressure $P_R$ in the exhaust pipe 35). Namely the line pressure $P_L$ is modulated.

Figure 7:
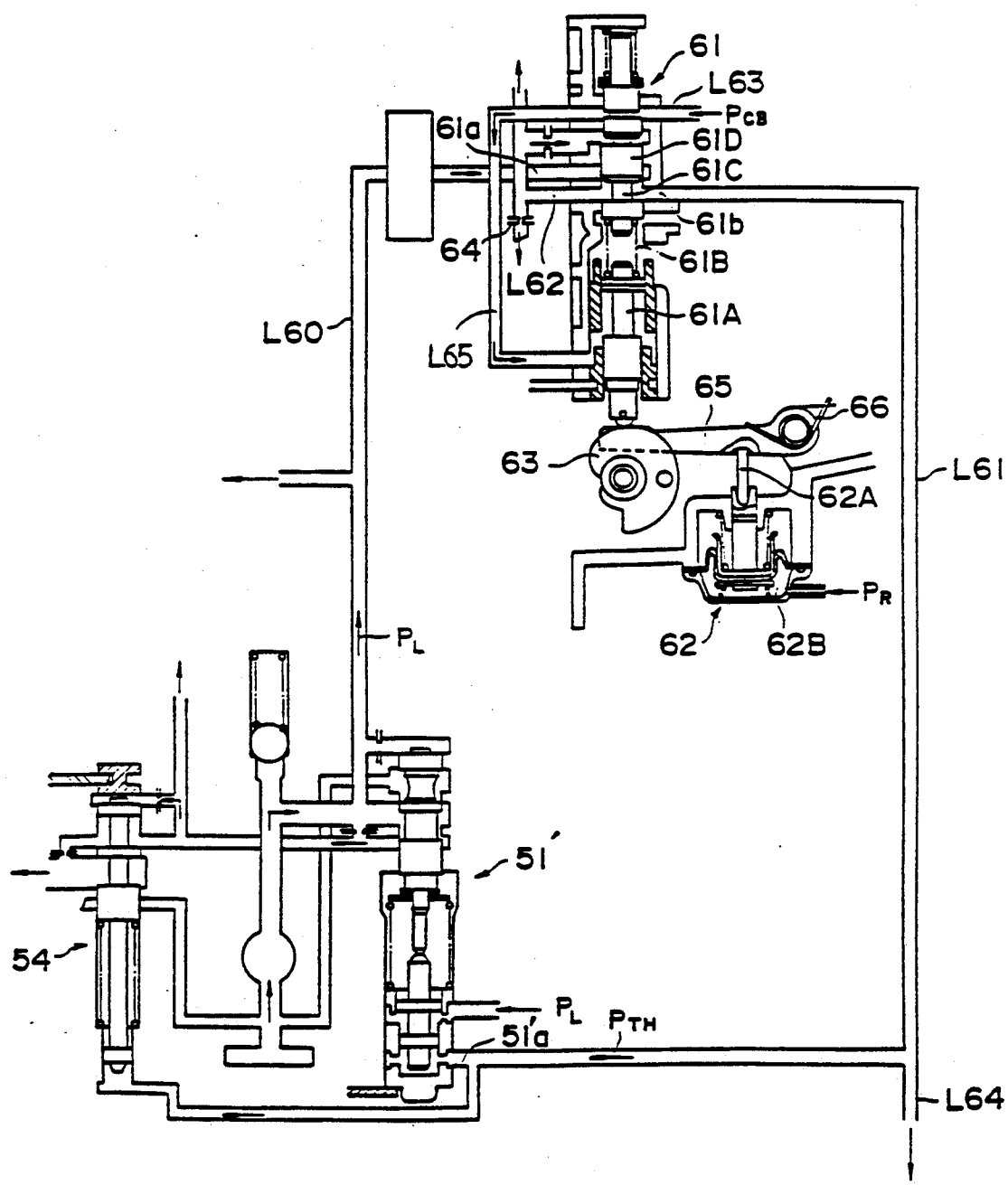
FIG. 7 is a hydraulic circuit diagram for a hydraulic pressure control apparatus according to a modified embodiment of the present invention.

FIG. 7 shows a modified embodiment of the oil pressure control apparatus, wherein, in contrast to the embodiment of FIG. 6 in which the actuator is mounted on the primary regulating valve which is directly controlled in its operation by the operating signal pressure $P_R$ corresponding to the absorbed power signal R, an actuator 62 is mounted on a primary throttle valve 61 and a throttle pressure $P_{TH}$ inputted to the primary regulating valve 51' is regulated by the operating signal pressure $P_R$ to regulate the line pressure $P_L$ by the primary regulating valve 51'.

Referring to FIG. 7, a primary regulating valve 51' is similar in construction to the primary regulating valve 51 of FIG. 6 except that the actuator provided in the valve 51 is not provided in the valve 51'. The primary throttle valve 61 functions to produce a throttle pressure $P_{TH}$ corresponding to the degree and changing manner of foot pressure applied to the accelerator pedal 25, that is to the engine output. Thus, on depressing the accelerator pedal 25, a throttle cam 63 thrusts a primary downshift plug upwardly in FIG. 7 by means of a throttle cable connected to the pedal 25. In this manner, a spool 61c is slid upwards in FIG. 7 by means of a spring 61B, while a line pressure input port 61a is opened by a land 61D to establish hydraulic communication between the line pressure input port 61a and a throttle pressure output port 61b. The line pressure $P_L$ inputted from line pressure oil path L60 is regulated by the primary throttle valve 61 so as to be input to an input port 51'a of the primary regulating valve 51' by means of throttle pressure oil path 61 from the throttle pressure output port 61b as a throttle pressure $P_{TH}$.

The line pressure $P_L$, inputted from the line pressure input port 61a, is discharged in a small amount via an orifice 64 from oil path L62, while acting on the spool 61C in conjunction with a cutback pressure $P_{CB}$ inputted from oil path L63, as the back pressure, for restoring the spool 61C for slightly closing the line pressure input port 61a. Thus the throttle pressure $P_{TH}$ is regulated to a hydraulic pressure corresponding to the opening degree of the line pressure input port 61a. The throttle pressure $P_{TH}$, thus regulated by the primary throttle valve 61, acts on an accumulator control valve, not shown, from primary regulating valve 51' secondary regulating valve 54 and oil path L64, for regulating the line pressure $P_L$ and the accumulator control pressure to a pressure corresponding to the throttle opening $\theta$.

Meanwhile, the cutback pressure $P_{CB}$ acting upwardly ($A_1 > A_2$ where $A_1$ and $A_2$ being active surface areas of lower and upper lands on which the cutback pressure $P_{CB}$ acts) on downshift plug 61A via oil path L65 acts for deducting from the force of spring 61B acting on a throttle cam 63 to reduce the force of foot pressure applied on the accelerator pedal 25.

An actuator 62 is mounted on the primary throttle valve 61 in such a manner that the distal end of a lever 65, the proximal end of which is rotatably supported on the valve body side, abuts on the lower end of the primary downshift plug 61A at the same position as the cam 63, this level 65 being turned clockwise in FIG. 7 to urge the primary downshift plug 61A upwardly in FIG. 7, similarly to the function of cam 63. Meanwhile, the lever 65 is urged by spring 66 counterclockwise in FIG. 7.

The actuator 62 is arranged beneath the lever 65, with the upper end of a vertically movable rod 62A of the actuator 62 abutting on the lower end of the lever 65. When the above mentioned operating signal pressure $P_R$ is introduced into a chamber 62B, the rod 62A is raised with increase in the pressure in the chamber 62B for turning the lever 65 clockwise in FIG. 7. Thus, during operation of the exhaust brake 27, the primary downshift plug 61A is slid upwardly in FIG. 7 in accordance with the magnitude of the operating signal pressure $P_R$, that is of the absorbed power R, for regulating the throttle pressure $P_{TH}$ by the land 61D of the spool 61C.

In this manner, the throttle pressure $P_{TH}$, modulated in accordance with the absorbed torque R, is inputted to the primary regulating valve 51', and the line pressure $P_L$ further is modulated by the throttle pressure $P_{TH}$, so that the line pressure $P_L$ is modulated in accordance with the absorbed torque R.

Thus, during the operation of the exhaust brake 27, the primary throttle valve 61 is controlled in its operation by actuator 62 on the basis of the operating signal pressure $P_R$, so that the line pressure $P_L$ is increased with increase in the absorbed torque R of engine, (i.e., pressure $P_R$ in the exhaust pipe 32 shown in FIG. 1,) in accordance to the value of the absorbed torque.

Figure 8:
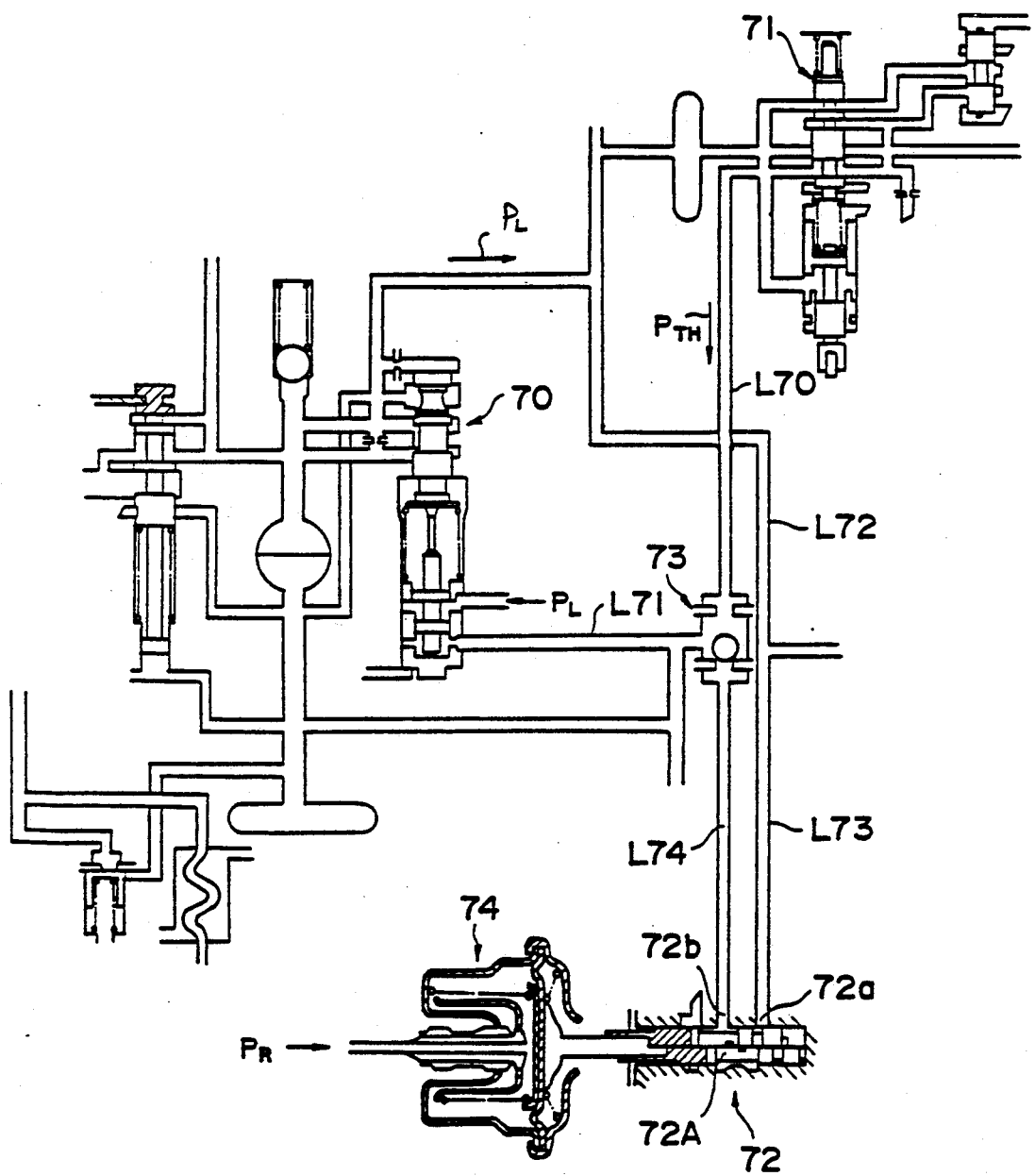
FIG. 8 is a hydraulic circuit diagram for a hydraulic pressure control apparatus according to another modified embodiment of the present invention.

FIG. 8 shows another modified embodiment of a hydraulic pressure control apparatus of the present invention, wherein a signal valve 72 and a check valve 73 are connected between a primary regulating valve 70 and a primary throttle valve 71, while an actuator 74 actuated by an operating signal pressure $P_R$ is connected to the signal valve 72.

Thus, when the exhaust brake 27 is out of operation, the throttle pressure $P_{TH}$ from the primary throttle valve 71 is introduced via oil path L70, check valve 73 and oil path L71 into a primary regulating valve 70, and the line pressure $P_L$ is regulated in accordance with the throttle pressure $P_{TH}$.

When the exhaust brake 27 is in operation, the operating signal pressure $P_R$ is inputted to the actuator 74, and a spool 72A of the signal valve 72 is slid towards left in FIG. 8 as a funtion of the valve of the operating signal pressure $P_R$ (negative pressure). Hence, with the sliding of the spool 72A, the line pressure $P_L$ inputted from line pressure oil path L72 via oil path L73 to an accordance with the operating signal pressure $P_R$ before being outputted at output port 72b so as to be inputted to the primary regulating valve 70 after switching the check valve 73 to ultimately regulate the line pressure $P_L$ by the primary regulating valve 70.

In this manner, during the operation of the exhaust brake 27, signal valve 72 is controlled in its operation by actuator 74 on the basis of the operating signal pressure $P_R$ so that line pressure $P_L$ is increased in accordance to the increase in the absorbed torque R, that is the pressure within the exhaust pipe 32 shown in FIG. 1.

Figure 9:
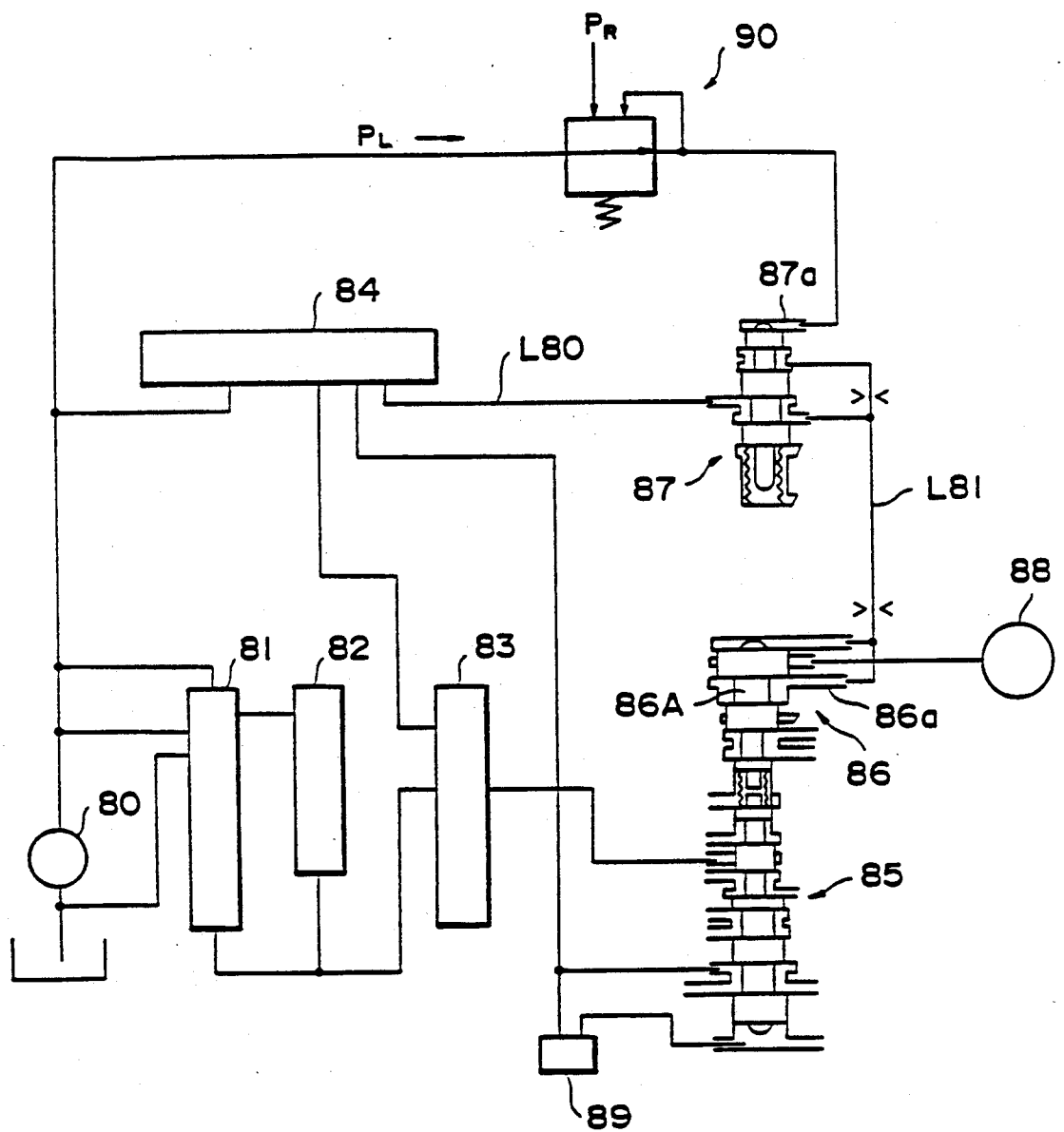
FIG. 9 is a hydraulic circuit diagram for a hydraulic pressure control apparatus according to a further modified embodiment of the present invention.

FIG. 9 shows a further modified imbodiment of the hydraulic pressure control apparatus of the present invention wherein the numeral 80 denotes an oil pump, the numeral 81 a primary regulating valve, the numeral 82 a secondary regulating valve, the numeral 83 a throttle valve, the numeral 84 a manual valve, the numeral 85 a shift valve, the numeral 86 a low coast shift valve, the numeral 87 a low coast modulating valve, the numeral 88 a friction engaging element and the numeral 89 a governor valve. To a control signal pressure input port 87a of this low coast modulating valve 87 is connected a signal valve 90 to which is inputted the exhaust braking operating signal pressure $P_R$.

When the exhaust brake 27 is out operation, line presure $P_L$ is inputted via the signal valve 90 to a control signal pressure input port 86a of low coast modulating valve 86 via signal valve 90 to thrust the spool 86A downwardly in FIG. 9 to reduce the line pressure $P_L$ introduced from the manual valve 84 via oil path L80 to supply the thus reduced line pressure via oil path L81 and low coast shift valve 86 to the friction engaging element 88.

When the exhaust brake 27 is in operation, the operating signal pressure $P_R$ is inputted to the signal valve 90 to reduce the line pressure $P_L$ as a function of the magnitude of the operating signal pressure $P_R$ to output the thus reduced line pressure to the low coast modulator valve 87. Therefore, at the low coast modulating valve 87, the line presure $P_L$ outputted via manual valve 84 to the low coast shift valve 86 is increased in proportion to the ecrease in the oil pressure introduced into control signal pressure input port 87a.

In this manner, during operation of the exhaust brake 27, signal valve 90 is controlled in its operation on the basis of the operating signal pressure $P_R$, in such a manner that the oil pressure engaging with the friction engaging element 88 is increased in accordance to the increase in the absorbed power R, that is the pressure within the exhaust pipe 32.

Figure 10:
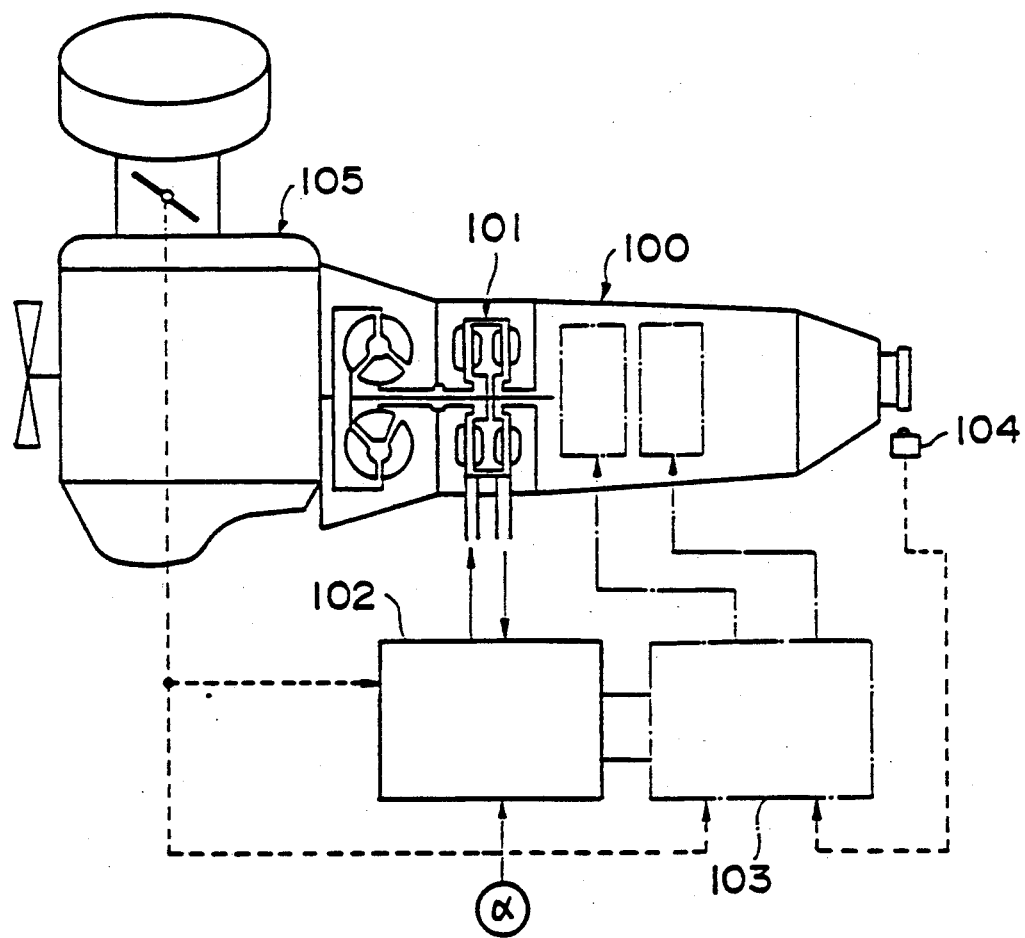
FIG. 10 is a diagrammatic view showing another embodiment of a retarding control apparatus in a hydraulic pressure control apparatus of the present invention.
Figure 11:
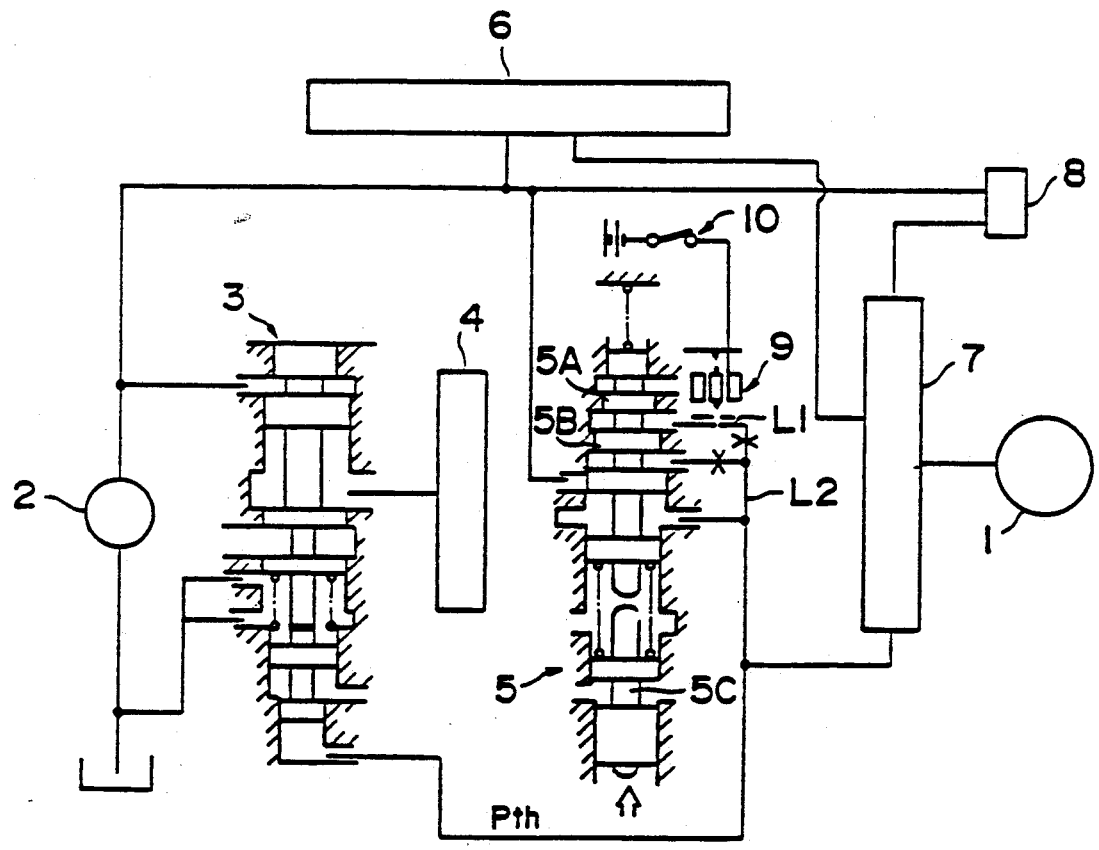
FIG. 11 is a hydraulic circuit diagram for a conventional hydraulic pressure control apparatus.
Figure 12:
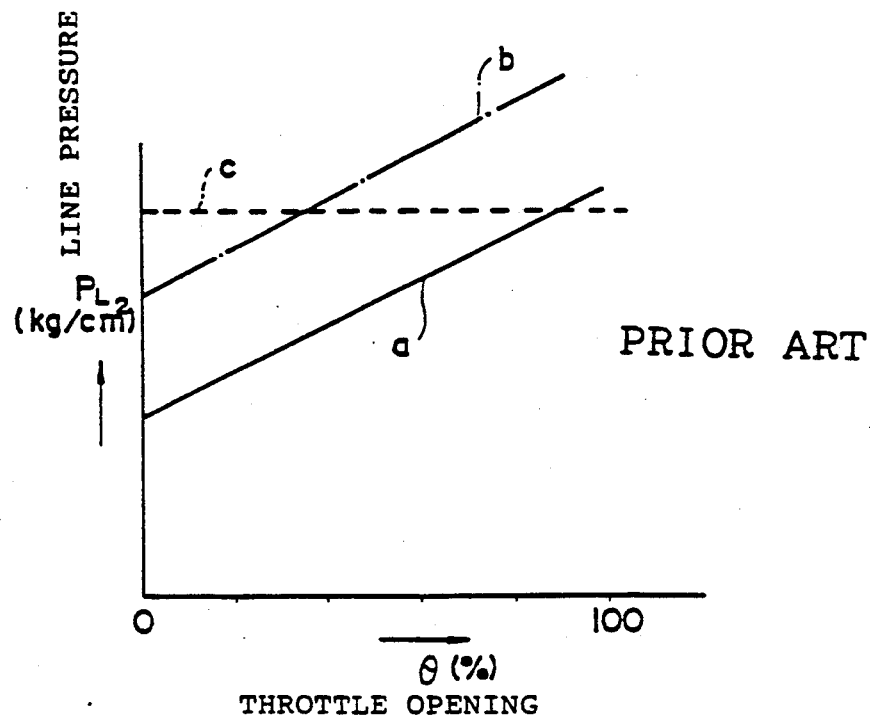
FIG. 12 is a diagram showing the relation between the throttle opening and the hydraulic line pressure in the conventional hydraulic pressure control apparatus.

Although the foregoing description has been made of the case employing the exhaust brake as the retarder, the present invention may also be applied to the case employing a fluid retarder 101 incorporated in an automatic transmission system 100 as shown in FIG. 10.

Referring to FIG. 10, the numeral 101 denotes a fluid retarder, the numeral 102 a retarder control circuit, the numeral 103 a shift change control circuit and the numeral 104 a vehicle speed sensor. The exhaust valve opening command signal or retarding singal α from the retarding apparatus shown in FIG. 4 is inputted to a retarder control circuit 102, which regulates the supply pressure or flow rate to the fluid retarder 101, which in turn operates to transfrom the reverse drive kinetic energy from the wheel side into thermal energy to effect retarding control. The operating signal pressure $P_R$ outputted from the retarder control circuit 102 may be inputted to the actuator in any of the embodiments aforementioned.

From the foregoing it is seen that, with the hydraulic pressure control apparatus for an automatic transmission according to a second aspect of the present invention, the line pressure of the hydraulic pressure control circuit is regulated as a function of the absorbed torque of the engine during retarding control, so that the shift down shock during the retarding control may be reduced, while the load of the automatic transmission system exerted to the friction engaging elements may be reduced to improve its durability.

Also according to the third aspect, the retarding control can be accomplished in accordance with the running states of the vehicle properly upon or during braking, i.e., the driver's intent for deceleration.

It should be noted that modifications may be done without departing from the gist of the present invention within the gist disclosed herein and scope defined by the appended claims.

What is claimed is:

1. A hydraulic pressure control apparatus for an automatic transmission for a vehicle comprising:
   absorbed power sensing means for sensing absorbed power of an engine,
   signal generating means for outputting a signal responsive to an engine output,
   oil pressure generating means for generating an oil pressure,
   pressure regulating means for regulating the pressure oil from said oil pressure generating means to a predetermined pressure, and
   pressure modulating means, provided to said pressure regulating means, for modulating said predetermined pressure by receiving output signals from said absorbed power sensing means and said signal generating means wherein said predetermined pressure is modulated according to a characteristic curve which is a function of the output signal from the absorbed power sensing means of the engine.

2. The hydraulic pressure control apparatus according to claim 1 wherein said absorbed power is produced by the operation of an exhaust braking system having an exhaust brake valve in an exhaust system of the engine.

3. The hydraulic pressure control apparatus according to claim 2, wherein said absorbed power sensing means includes opening sensing means for sensing the opening degree of said exhaust brake valve.

4. The hydraulic pressure control apparatus according to claim 2, wherein said power sensing means is provided as a pressure sensor for sensing the pressure in the exhaust pipe between the engine and an exhaust brake valve provided in the exhaust system.

5. The hydraulic pressure control apparatus according to claim 1, wherein said pressure regulation control means includes a primary regulator valve controlled by a throttle pressure as the output signal from said signal generating means, the primary regulator valve having, as said pressure modulating means, an actuator actuated by the output signal from the absorbed power sensing means and acting on a spool of the primary regulator valve.

6. The hydraulic pressure control apparatus according to claim 5, wherein said actuator has an actuable chamber which receives a signal pressure representative of an exhaust pipe pressure as the output signal from the absorbed power sensing means and exerts an output force on the spool.

7. The hydraulic pressure control apparatus accordiang to claim 1, wherein said characteristics curve is a function of engine rotational speed and the absorbed power of the engine.

8. The hydraulic pressure control apparatus according to claim 7, wherein said absorbed power of the engine is represented by the opening degree of an exhause brake valve.

* * * * *

UNITED STATES PATENT AND TRADEMARK OFFICE
CERTIFICATE OF CORRECTION

PATENT NO. : 5,107,725

DATED : April 28, 1992

INVENTOR(S) : Shigeo Takahashi

It is certified that error appears in the above-identified patent and that said Letters Patent is hereby corrected as shown below:

Title page, item [21] should read as follows:

-- Appl. No.: 501,795 --.

Signed and Sealed this

Twenty-second Day of June, 1993

Attest:

MICHAEL K. KIRK

Attesting Officer     Acting Commissioner of Patents and Trademarks